United States Patent [19]
Gunderson

[11] Patent Number: 5,683,748
[45] Date of Patent: Nov. 4, 1997

[54] PROCESS FOR PROTECTING CONCRETE SEWER PIPES

[75] Inventor: Byron L. Gunderson, Yorba Linda, Calif.

[73] Assignee: PSC Technologies, Inc., Del.

[21] Appl. No.: 484,453

[22] Filed: Jun. 7, 1995

[51] Int. Cl.$^6$ ..................................................... B05D 7/22
[52] U.S. Cl. .......................... 427/236; 427/230; 427/421; 118/DIG. 10; 118/306; 118/317
[58] Field of Search ........................................ 427/236, 421, 427/230; 118/DIG. 10, 306, 317; 106/14.11, 14.21, 461

[56] References Cited

U.S. PATENT DOCUMENTS

| | | | |
|---|---|---|---|
| 4,456,635 | 6/1984 | Albanese et al. | 427/236 |
| 4,786,525 | 11/1988 | Kayser et al. | 427/236 |
| 5,246,641 | 9/1993 | Perkins et al. | 427/236 |
| 5,514,357 | 5/1996 | Richmond et al. | 106/471 |

*Primary Examiner*—Shrive Beck
*Assistant Examiner*—David M. Maiorana

[57] ABSTRACT

A process for inhibiting acidic corrosion in the crown of a concrete sewer pipeline of the type created by the generation of sulfuric acid within the pipeline and a lowering of the pH at the surface of the concrete. The process comprises the forming of a slurry of magnesium hydroxide, preferably precipitated from seawater, and water wherein the magnesium hydroxide comprises at least about 25-50% of the slurry by weight, and spraying the slurry onto and along the crown of the concrete pipeline to provide a slurry coating on the crown of the pipeline of about 0.2 inches in thickness so as to provide a relatively long lasting barrier of high pH and thereby prevent acidic corrosion of the pipeline.

12 Claims, 1 Drawing Sheet

PROCESS FOR PROTECTING CONCRETE SEWER PIPES

BACKGROUND OF THE INVENTION

The present invention relates to protective coatings for concrete sewer pipe and, more particularly, to the use of a slurry of magnesium hydroxide and water to prevent acidic corrosion of such pipes. As raw sewage is carried in concrete pipes to a sewage treatment plant, microbial action within the sewage releases hydrogen sulfide gas into the air space above the liquid sewage. As this gas comes into contact with the exposed upper portion of the inner surface of the pipe in the presence of moisture and the microbes commonly present in raw sewage, the pH at the surface of the concrete is reduced and the gas reacts to form sulfuric acid. The sulfuric acid then reacts with the cement binder in the concrete and destroys the chemical bond of the cement in the concrete, resulting in the gradual loss of the structural integrity of the pipe. This form of acidic corrosion has caused many sewer pipes buried beneath roadways to collapse resulting in the subsequent collapse of the roadway.

Efforts to avoid the corrosion of concrete pipe have included the introduction of an alkali material, typically sodium hydroxide, to the flowing sewage in an attempt to control the generation of the hydrogen sulfide ($H_2S$) gas. This use of sodium hydroxide has been employed both on a continual basis and intermittently in high dosages as a form of shock treatment. In both cases a very large quantity of sodium hydroxide is required which is both expensive and presents a significant safety hazard to the personnel involved. Injecting air into the air space above the flowing sewage has also been tried in an attempt to dilute or displace the $H_2S$ gas. This requires a very large air compressor to keep the air moving and has not proved successful. The use of a plastic liner in the sewage pipe to form an inert barrier has also been employed. The use of such a liner is very expensive and requires re-routing of the sewage while the lining is secured to the interior of the pipe. As a result, the use of the plastic liners has not met with success.

The direct application of an alkali material such as sodium hydroxide or soda ash has been found to be temporarily effective in reducing this acidic corrosion in concrete sewer lines. Such a method involves the use of a floating spray device which when pulled through the inside of the sewage pipe sprays the alkali material onto the exposed concrete surface. Sodium hydroxide, however, is highly caustic and thus presents a substantial safety hazard to the workers. While soda ash is not as caustic as sodium hydroxide, it still presents a safety hazard as well as handling difficulties as soda ash typically freezes below 80° F. Such safety and handling problems coupled with the short duration of protection afforded by these materials have discouraged their widespread use.

The present invention has been found to overcome these problems by providing a high pH protective coating to the exposed surface of the concrete sewage crown in a manner which is safe, effective, long lasting and easy to apply. It is also desirable to utilize a method of corrosion control which can be implemented at a relatively low cost and with a minimum disruption of the surrounding community. The present invention achieves these results as well.

SUMMARY OF THE INVENTION

Briefly, the present invention comprises the direct application of a slurry of magnesium hydroxide and water to the interior crown portion of concrete sewer pipe utilizing conventional spraying apparatus to provide the crown of the pipe with a protective high pH coating. This coating adheres to the concrete surface of the pipe and provides long lasting protection against the corrosion effects of sulfuric acid within the sewer pipeline. The magnesium hydroxide preferably employed in the slurry of the present invention is formed by a seawater precipitation process and comprises about 50% of the slurry by weight. The slurry is sprayed onto and along the interior crown of the concrete pipe from a movable floating spray platform drawn through the pipe. The flow rate of the slurry through the spray nozzles and the rate of advancement of the platform are balanced to provide a protective coating of the pipe crown which is about 0.2 inches in thickness and extends the entire length of the concrete sewer pipeline. The slurry coating adheres well to the crown of the concrete pipe and maintains a pH level of about 10 at the surface of the crown for an extended period of time to prevent the corrosive effects of the sulfuric acid generated by the sewage within the pipeline. The slurry coating is slowly consumed by the sulfuric acid over time and the pH level at the concrete surface gradually decreases. When the pH level decreases below 4, the process is repeated and degeneration of the concrete pipeline through acidic corrosion is avoided.

It is the principal object of the present invention to provide an improved process for preventing acidic corrosion of the crown of concrete sewer pipelines.

It is another object of the present invention to provide a process for preventing acidic corrosion of the crown of sewer pipelines which can be safely and economically employed and is not harmful to the concrete surface.

It is a further object of the present invention to provide a protective coating for concrete sewer pipes which prevents acidic corrosion of the crown of the pipe and can be easily applied with existing spray equipment.

It is a still further object of the present invention to provide a protective coating for concrete sewer pipes which provides a durable and long lasting barrier of high pH along the interior crown portion of the pipe to prevent acidic corrosion thereof.

These and other objects and advantages of the present invention will become readily apparent from the following detailed description taken in conjunction with the accompanying drawing.

IN THE DRAWING

FIG. 1 is a schematic representation of the application of the slurry of the present invention to the interior crown of a portion of a concrete sewer pipeline.

DESCRIPTION OF THE PREFERRED EMBODIMENT

Figure 1:
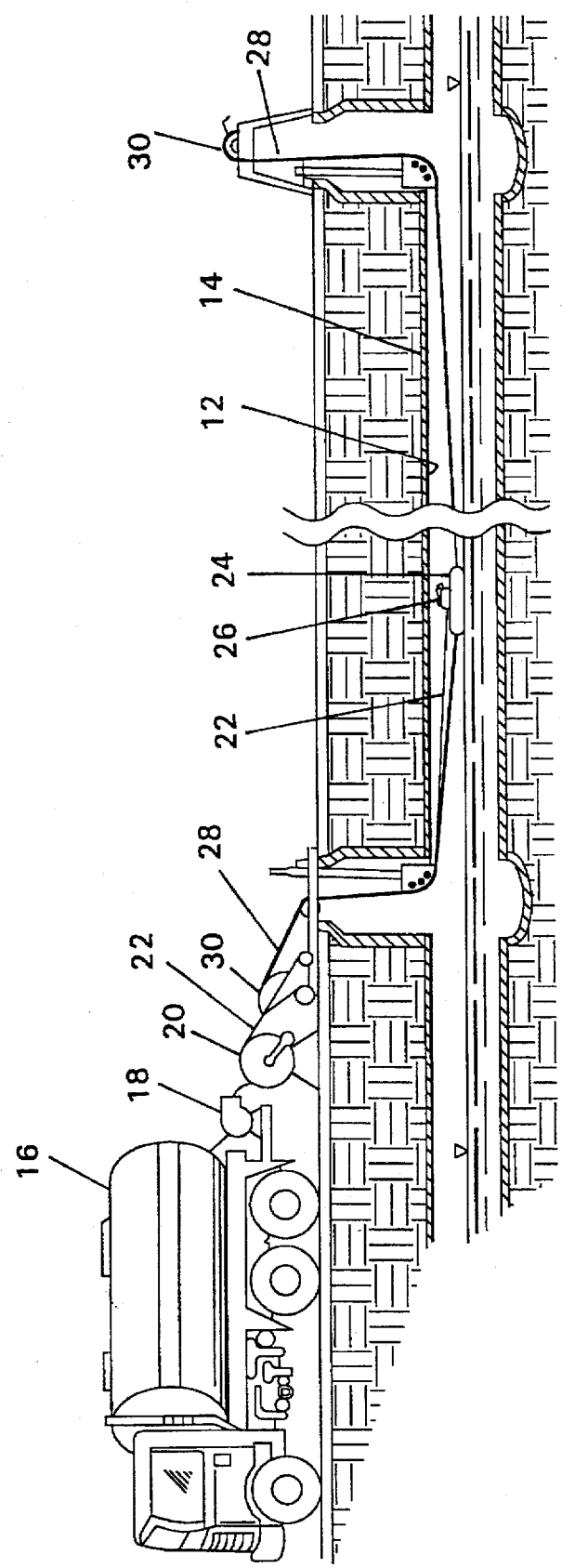

The present invention comprises the application of a slurry of magnesium hydroxide onto the crown portion of a concrete sewer pipeline as illustrated in FIG. 1. The slurry is comprised of water, magnesium hydroxide and a suspending agent in which the magnesium hydroxide preferably comprises about 50% of the slurry by weight. While the percentage of magnesium hydroxide in the slurry could be reduced to as low as about 25% and raised as high as to about 60%, a 50% concentration is preferred. As the percentage of magnesium hydroxide in the slurry is reduced, the slurry becomes less viscous and will not adhere as well to the concrete surface. In addition, the protection afforded by the slurry will not be as long lasting. As the magnesium hydroxide concentration increases beyond 50%, the slurry becomes so viscous as to create pumping and spraying difficulties.

While magnesium hydroxide can be formed in several ways to provide substantially chemically equivalent materials which could be employed in the present invention, a seawater precipitation process has been found to provide a far superior product. The use of a seawater precipitation process provides a magnesium hydroxide product having a superior crystalline structure in that it defines a larger surface area which results in faster reaction time with less material. Magnesium hydroxide precipitated from seawater has also been found to have superior flow characteristics and less contaminants then mined magnesium hydroxide and obviates the need for repetitive filtering. In addition, the use of the precipitated material avoids the caustic effects of lime. To form magnesium hydroxide with a seawater precipitation process, seawater is typically pumped into and allowed to react with dolomite in the presence of sulfuric acid, forming magnesium hydroxide as a precipitate. The slurry of the present invention is then formed by mixing the magnesium hydroxide precipitate with water and adding a suitable suspending agent such that the magnesium hydroxide is maintained in suspension and comprises about fifty percent of the slurry by weight. Seawater precipitated magnesium hydroxide with a suitable suspending agent mixed therein for use in forming the preferred slurry of the present invention is manufactured by Magnesia Chemicals of Moss Landings, Calif. under the designation MHS 50.

The magnesium hydroxide slurry of the present invention is applied to the interior crown portion 12 of a concrete sewer pipeline 14 by a spraying process as illustrated in FIG. 1. The apparatus for spraying the magnesium hydroxide slurry includes a portable slurry storage/feed tank 16, a high pressure pump 18 capable of pumping the slurry at about ten gallons per minute at a pump discharge pressure range of between about 50–100 psig, a hose reel 20 containing the requisite length of a high pressure, chemically resistant hose 22, a floating platform 24 provided with spray nozzles 26 which can be inserted into various diameters of concrete sewer pipe and cables 28 and winches 30 for controllably moving the spray platform through the pipeline 14 at a desired rate.

As the slurry is pumped from tank 16 through hose 22 and nozzles 26 mounted on the floating platform 24, the platform is drawn by the cables 28 and winches 30 along the interior of the pipeline. As the platform moves along the pipeline, the spray nozzles direct the slurry in a uniform spray about the crown portion of the pipe to effect a thorough covering thereof. As the overall length of a sewer line is typically longer than the lengths of the hose and cables which can be accommodated by conventional winches, it is generally necessary to spray the line in sections. Accordingly, the spraying system is pulled through the sewer line from one man hole to another using the cables and winches from which the speed of travel of the platform can be controlled. A similar system has been employed by the Sanitation Districts of Los Angeles County for spraying caustic soda onto the sewer crown in an effort to effect the corrosion control.

The high pressure chemically resistant hose 22 employed in the present invention is typically about 1800–2500 ft. long and one inch in diameter, although a smaller diameter hose would be preferable to reduce its weight and allow the hose reel to accommodate a greater length of hose. The spray nozzle 26 mounted on a floating platform 24 are configured to provide an even spray of slurry about the entire crown portion of the concrete pipe extending above the sewage level therein. The particular nozzles employed will vary depending on the diameter of the sewer pipeline. Nozzles suitable for use in a five foot diameter concrete sewer line are marketed by Bete Fog Nozzle Incorporated of Greenfield, Mass. under the Model No. MP125M. For smaller 36 inch diameter sewer pipe, fan-type nozzles marketed by Spraying System Company of Wheaton, Ill. under the designation H¼ USS 8030 are more suitable as the larger nozzles would deposit an excessive amount of slurry on the pipe wall.

In use, the rate of travel of the platform 24 through the pipeline 14 is regulated by the winches 30 so as to form a uniformed coating of slurry on the pipe crown of about 0.2 inches in thickness. This is typically achieved using the above-described apparatus by moving the platform at a rate of about 12–15 ft per minute. While a thinner coating of slurry could be formed on the concrete and still provide protection against acidic corrosion, the duration of protection would be substantially reduced. It has been found that a protective coating of slurry of about 0.2 inches. in thickness provides protection against sewer line corrosion for about 140 days as compared to about 35 to 40 days with soda ash. If the thickness of the coating were reduced to about 0.1 inches., the length of protection might be reduced by about one half, although a precise correlation between the thickness of the coating and the length of protection has yet to be determined. As both the slurry and its method of application are relatively inexpensive as compared to the materials and processes employed in the prior art, there will be no apparent benefit in the application of a thinner protective coating. The application of a thicker coating would also be undesirable as the weight of the thicker coating would cause the slurry to fall from the crown of the pipe wall. A reduction in the percentage of magnesium hydroxide in slurry would also reduce the effective life of the coating.

While the slurry of the present invention is particularly adapted for corrosion control in concrete sewer pipelines, its use would be beneficial in any application in which concrete was subject to corrosion as a result of the surface of the concrete being subjected to a pH control problem, as for example inside the bulk head of a water treatment plant. Various changes and modifications can be made in carrying out the present invention without departing from the spirit and scope thereof. insofar as these changes and modifications are within the purview of the appended claims, they are to be considered as part of the present invention.

I claim:

1. A process for inhibiting acidic corrosion in the crown of a concrete sewer pipeline, said process comprising the steps of forming a slurry consisting essentially of magnesium hydroxide and water and applying the slurry onto and along the crown of the pipeline.

2. The process of claim 1 wherein the slurry is formed such that the magnesium hydroxide comprises about 50% of the slurry by weight.

3. The process of claim 1 wherein said magnesium hydroxide is formed by a seawater precipitation process.

4. A process for inhibiting acidic corrosion in the crown of a concrete sewer pipeline, said process comprising the steps of forming a slurry consisting essentially of magnesium hydroxide and water and spraying the slurry onto and along the crown of the pipeline.

5. The process of claim 4 wherein the slurry is formed such that the magnesium hydroxide comprises about 50% of the slurry by weight.

6. The process of claim 4 wherein said magnesium hydroxide is formed by a seawater precipitation process.

7. A process for inhibiting acidic corrosion in the crown of a concrete sewer pipeline, said process comprising the steps of forming a slurry consisting essentially of magnesium hydroxide and water wherein the magnesium hydroxide is precipitated from seawater and comprises about 50% of the slurry by weight and spraying the slurry onto and along a portion of the crown of the pipeline so as to form a coating of slurry on said portion of the pipeline of about 0.1–0.2 inches in thickness.

8. A process for inhibiting acidic corrosion in the crown of a concrete sewer pipeline, said process comprising the steps of forming a slurry consisting essentially of magnesium hydroxide and water and applying the slurry onto and along the crown of the pipeline so as to form a coating of slurry on the pipeline of about 0.1–0.2 inches in thickness.

9. The process of claim 8 wherein said applying step comprises the step of spraying the slurry from a movable platform disposed within and traveling along the pipeline.

10. A process for inhibiting acidic corrosion in the crown of a concrete sewer pipeline, said process comprising the steps of forming a slurry consisting essentially of magnesium hydroxide, water and a suspending agent wherein the magnesium hydroxide is precipitated from seawater and comprises about 50% of the slurry by weight, pumping the slurry through a spray nozzle disposed in the interior of the pipeline and moving the spray nozzle along the pipeline so as to cover the crown portion of the pipe with the slurry.

11. A process for inhibiting acidic corrosion in the crown of a concrete sewer pipeline, said process comprising the steps of forming a slurry consisting essentially of magnesium hydroxide and water wherein the magnesium hydroxide comprises from about 25–50% of the slurry by weight, pumping the slurry through a spray nozzle disposed in the interior of the pipeline and moving the spray nozzle along the pipeline so as to cover the crown portion of the pipe with the slurry.

12. The process of claim 11 including the step of controlling the movement of the spray nozzle along the interior of the pipeline so that the slurry forms a coating on the crown of the pipeline of about 0.1–0.2 inches in thickness.

* * * * *

Disclaimer 5,683,748 - Byron L. Gunderson, Yorba Linda, California. PROCESS FOR PROTECTING CONCRETE SEWER PIPES. Patent dated November 4, 1997. Disclaimer filed October 26, 1998, by the assignee, PSC Technologies, Inc.

Hereby enters this disclaimer to the entire term of said patent.
*(Official Gazette, July 27, 1999)*